US011101970B2

(12) United States Patent
Kim et al.

(10) Patent No.: US 11,101,970 B2
(45) Date of Patent: Aug. 24, 2021

(54) REPEATER AND OPERATING METHOD THEREOF

(71) Applicant: SOLiD, INC., Seongnam-si (KR)

(72) Inventors: Hyunchae Kim, Seoul (KR); Hoony Hong, Seoul (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 16/423,922

(22) Filed: May 28, 2019

(65) Prior Publication Data
US 2019/0363864 A1    Nov. 28, 2019

(30) Foreign Application Priority Data

May 25, 2018  (KR) .................. 10-2018-0059902
May 27, 2019  (KR) .................. 10-2019-0061617

(51) Int. Cl.
*H04B 7/14*    (2006.01)
*H04L 5/14*    (2006.01)
*H04B 7/15*    (2006.01)

(52) U.S. Cl.
CPC .......... *H04L 5/14* (2013.01); *H04B 7/15* (2013.01)

(58) Field of Classification Search
CPC ..... H04L 5/14; H04L 37/2606; H04L 5/1469; H04L 2001/0097; H04B 7/15; H04B 7/15557; H04B 7/14; H04B 7/145; H04B 7/15528; H04B 7/15542; H04B 7/15507; H04B 7/2643; H04W 72/04; H04W 72/0413; H04W 72/042; H04W 88/04; H04W 72/0446

USPC ....... 370/229, 230, 243, 252, 278, 279, 280, 370/282, 294, 315, 321, 328, 330, 436, 370/458, 466, 468, 492, 501
See application file for complete search history.

(56) References Cited

U.S. PATENT DOCUMENTS

| 2006/0256746 | A1* | 11/2006 | Quick | H04B 7/15507 |
| | | | | 370/315 |
| 2007/0201402 | A1* | 8/2007 | Cho | H04B 7/155 |
| | | | | 370/330 |
| 2008/0145057 | A1* | 6/2008 | Lee | H04W 88/085 |
| | | | | 398/103 |
| 2008/0260388 | A1* | 10/2008 | Kim | H04B 10/25753 |
| | | | | 398/115 |
| 2009/0116415 | A1* | 5/2009 | Kashima | H04B 7/1555 |
| | | | | 370/279 |

(Continued)

FOREIGN PATENT DOCUMENTS

KR    10-1566295 B1    11/2015

OTHER PUBLICATIONS

Search Report dated Oct. 4, 2019 from the European Patent Office in Application No. 19176777.

*Primary Examiner* — Nguyen H Ngo
(74) *Attorney, Agent, or Firm* — Sughrue Mion, PLLC

(57) ABSTRACT

An operating method of a repeater, the operating method comprises: receiving a first communication signal according to a first mobile communication standard, generating a time division duplex (TDD) switching signal based on information about a start point of the received first communication signal, and controlling switching of an uplink and a downlink of a repeater that relays a second communication signal according to a second mobile communication standard based on the generated TDD switching signal.

9 Claims, 5 Drawing Sheets

(56) References Cited

U.S. PATENT DOCUMENTS

| | | | |
|---|---|---|---|
| 2013/0248656 A1* | 9/2013 | Mohamadi | H04B 7/18504 244/190 |
| 2018/0103458 A1* | 4/2018 | Tooher | H04W 16/14 |
| 2018/0351633 A1* | 12/2018 | Birkmeir | H04W 52/0245 |
| 2019/0196555 A1* | 6/2019 | Mouser | G06F 1/1626 |

* cited by examiner

REPEATER AND OPERATING METHOD THEREOF

CROSS-REFERENCE TO RELATED APPLICATIONS

This application claims the benefits of Korean Patent Applications No. 10-2018-0059902, filed on May 25, 2018 and No. 10-2019-0061617, filed on May 27, 2019, in the Korean Intellectual Property Office, the disclosures of which are incorporated herein in their entireties by reference.

BACKGROUND

1. Field

The disclosure relates to a repeater and an operating method thereof, and more particularly, to a repeater capable of controlling uplink and downlink switching of the repeater for relaying a second communication signal according to a second mobile communication standard based on information about a start point of a first communication signal according to a first mobile communication standard, and an operating method thereof.

2. Description of the Related Art 5G new radio (NR) is a new radio access technology (RAT) developed by 3GPP for 5G mobile networks. The 5G NR aims to support new latency, reliability, and security at a low cost. The overall architecture of the 5G NR is designed to connect large-scale IoT devices and provide innovative services in a variety of areas such as healthcare, automobile, and public safety.

When a communication system operates in a time division duplex (TDD) mode of the 5G NR, it is required to determine switching timing of downlink communication and uplink communication. It takes a lot of resources to receive and demodulate a 5G NR signal to obtain information about a start point of the 5G NR signal.

SUMMARY

Provided is a repeater capable of controlling uplink and downlink switching of the repeater for relaying a second communication signal according to a second mobile communication standard based on information about a start point of a first communication signal according to a first mobile communication standard, and an operating method thereof.

According to an aspect of an embodiments, an operating method of a repeater includes receiving a first communication signal according to a first mobile communication standard; generating a time division duplex (TDD) switching signal based on information about a start point of the received first communication signal; and controlling switching of an uplink and a downlink of a repeater that relays a second communication signal according to a second mobile communication standard based on the generated TDD switching signal.

According to an aspect of an embodiments, the operating method further comprises obtaining information about the start point of the first communication signal from the received first communication signal.

According to an aspect of an embodiments, the obtaining of the information about the start point of the first communication signal comprises: obtaining the information about the start point by using a preamble of the first communication signal or extracting a synchronization signal included in the first communication signal to obtain the information about the start point.

According to an aspect of an embodiments, the generating of the TDD switching signal comprises: generating the TDD switching signal based on the information about the start point of the received first communication signal and TDD switching pattern information of the second communication signal.

According to an aspect of an embodiments, the TDD switching pattern information is determined based on a period of a downlink-uplink pattern, the number of consecutive downlink slots, the number of consecutive downlink symbols from a last downlink slot, the number of consecutive uplink slots from the end of the downlink-uplink pattern, and the number of consecutive uplink symbols from a first uplink slot.

According to an aspect of an embodiments, the generating of the TDD switching signal comprises: generating the TDD switching signal by compensating a preset time delay value for the information about the start point of the received first communication signal.

According to an aspect of an embodiments, the operating method further comprises: determining whether or not an error has occurred in the reception of the first communication signal.

According to an aspect of an embodiments, the generating of the TDD switching signal comprises: maintaining the TDD switching signal as the existing TDD switching signal when an error has occurred in the reception of the first communication signal.

According to an aspect of an embodiments, the first mobile communication standard is an LTE standard or an LTE-A standard, and the second mobile communication standard is a 5G standard.

According to an aspect of an embodiments, a repeater comprising: a switching signal generator configured to receive a first communication signal according to a first mobile communication standard and generate a TDD switching signal based on information about a start point of the received first communication signal; and a switching circuit configured to control uplink and downlink switching of a repeater that relays a second communication signal according to a second mobile communication standard based on the generated TDD switching signal.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
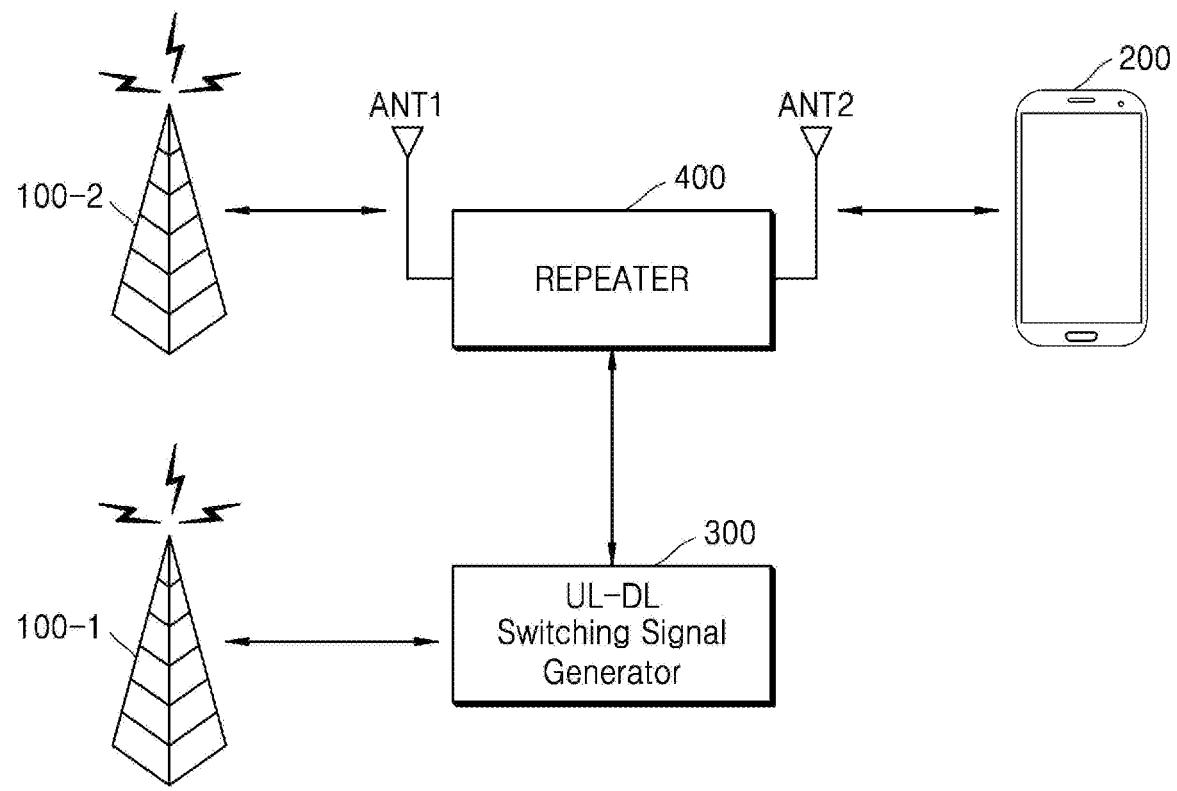
FIG. 1 is a conceptual diagram of a communication system according to an embodiment.

The inventive concept may be variously modified and have various example embodiments, so that specific example embodiments will be illustrated in the drawings and described in the detailed description. However, this does not limit the inventive concept to specific example embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the inventive concept. In addition, numeral figures (for example, 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit", "er", "or", "module", and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

FIG. 1 is a conceptual diagram of a communication system according to an embodiment.

Referring to FIG. 1, the communication system according to an embodiment may include a first base station 100-1, a second base station 100-2, a mobile communication terminal 200, an uplink-downlink switching signal generator 300, and a repeater 400.

The first base station 100-1 and the second base station 100-2 may provide communication services according to different mobile communication standards.

According to an embodiment, the first base station 100-1 may provide a communication service according to a previous communication standard (e.g., an LTE standard or an LTE-A standard) and the second base station 100-2 may provide a communication service according to the latest communication standard (E.g., a 5G standard).

The uplink-downlink switching signal generator 300 may receive a first communication signal according to a first mobile communication standard transmitted from the first base station 100-1. The uplink-downlink switching signal generator 300 may generate a time division duplex (TDD) switching signal based on information about a start point of the received first communication signal.

According to an embodiment, the uplink-downlink switching signal generator 300 may be included in the repeater 400 and may be implemented as a portion of the repeater 400.

Detailed configuration and operation of the uplink-downlink switching signal generator 300 will be described later below with reference to FIG. 2.

The repeater 400 may relay communication between the second base station 100-2 and the mobile communication terminal 200. The repeater 400 may receive a downlink signal transmitted from the second base station 100-2 via a first antenna ANT1 and relay the received downlink signal to the mobile communication terminal 200 through the second antenna ANT2. The repeater 400 may receive an uplink signal transmitted from the mobile communication terminal 200 via the second antenna ANT2 and relay the received uplink signal to the second base station 100-2 through the first antenna ANT1.

The first antenna ANT1 may be referred to as a donor antenna and the second antenna ANT2 may be referred to as a service antenna or a coverage antenna, but are not limited thereto.

According to an embodiment, the first antenna ANT1 of the repeater 400 may be replaced with a wired cable connected to the second base station 100-2.

Detailed configuration and operation of the repeater 400 will be described later below with reference to FIG. 3

Figure 2:
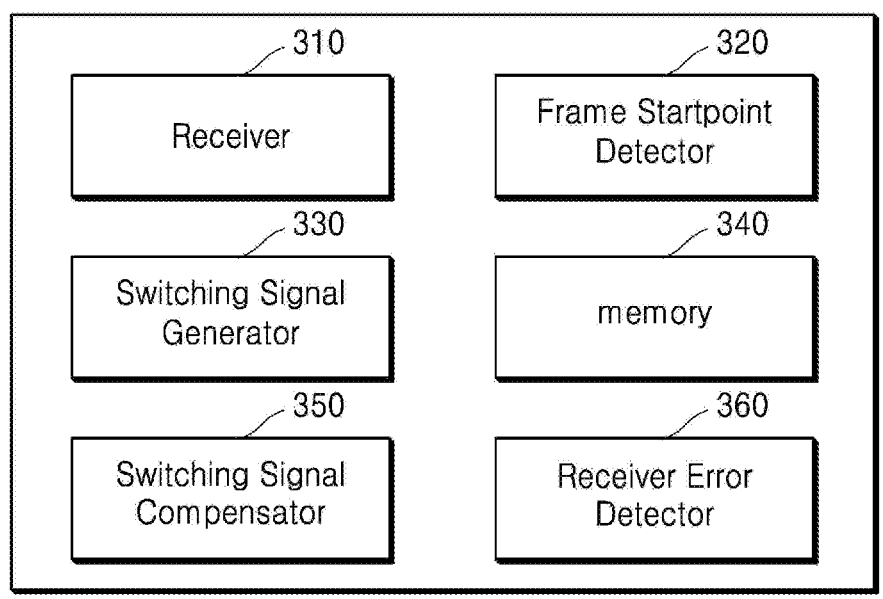
FIG. 2 is a block diagram according to an embodiment of an uplink-downlink switching signal generator shown in FIG. 1.

FIG. 2 is a block diagram according to an embodiment of the uplink-downlink switching signal generator 300 shown in FIG. 1. FIG. 3 is an example of a parameter for determining TDD switching pattern information of a mobile communication standard according to an embodiment.

Referring to FIGS. 1 and 2, the uplink-downlink switching signal generator 300 may include a receiver 310, a frame start point detector 320, a switching signal generator 330, a memory 340, a switching signal compensator 350, and a receiver error detector 360.

The receiver 310 may receive a first communication signal according to the first mobile communication standard transmitted from the first base station 100-1.

According to an embodiment, the receiver 310 may include a configuration for receiving the first communication signal according to the first mobile communication standard and processing the first communication signal into a form that can be processed in the uplink-downlink switching signal generator 300, such as a modem.

The frame start point detector 320 may detect a frame start point of the first communication signal according to the first mobile communication standard received via the receiver 310.

According to an embodiment, the frame start point detector 320 may use a preamble of the first communication signal to obtain information about the frame start point, that is, a start point of the first communication signal.

According to another embodiment, the frame start point detector 320 may extract a synchronization signal included in the first communication signal and use the extracted synchronization signal to obtain information about the frame start point, that is, the start point of the first communication signal.

The switching signal generator 330 may generate a TDD switching signal based on the information about the start point of the first communication signal detected by the frame start point detector 320.

According to an embodiment, the TDD switching signal may be a signal for controlling uplink and downlink switching of the repeater 400 that relays a second communication signal according to the second mobile communication standard.

According to an embodiment, the switching signal generator 330 may generate the TDD switching signal based on the information about the start point of the first communication signal and the TDD switching pattern information of the second communication signal.

According to an embodiment, the switching of the uplink and downlink of the repeater 400 that relays the second communication signal may be periodically repeated, and the TDD switching pattern information may broadly mean information about a pattern in which downlink slots, downlink symbols, uplink slots, and uplink symbols within one period are allocated.

Figure 3:
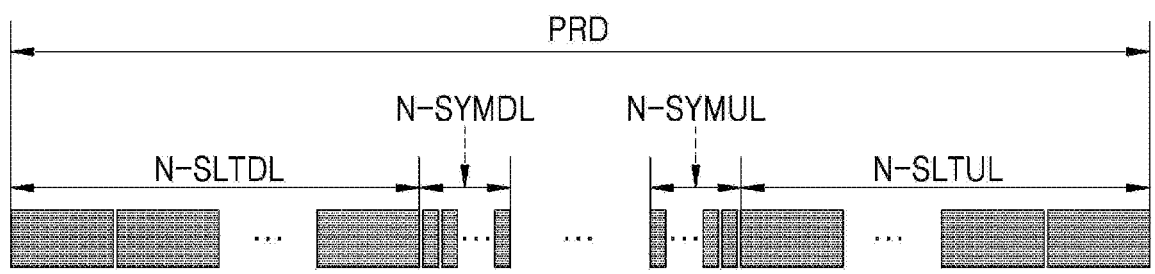
FIG. 3 is an example of a parameter for determining time division duplex (TDD) switching pattern information of a mobile communication standard according to an embodiment.

Referring to FIG. 3, the TDD switching pattern information may be determined based on at least one of one period of a downlink-uplink pattern PRD, the number of consecutive downlink slots N-SLTDL, the number of consecutive downlink symbols from the last downlink slot N-SYMDL, the number of consecutive uplink slots from the end of the downlink-uplink pattern N-SLTUL, and the number of consecutive uplink symbols from the first uplink slot N-SYMUL.

According to an embodiment, the TDD switching pattern information may be included in the first communication signal transmitted from the first base station 100-1 and received via the receiver 310.

According to another embodiment, the TDD switching pattern information may be received from a remote server (not shown) connected to the first base station 100-1.

Referring again to FIG. 2, the memory 340 may store data necessary for operation of each configuration in the uplink-downlink switching signal generator 300 and data generated in the process.

The switching signal compensator 350 may compensate a time delay value for the information about the start point of the first communication signal detected by the frame start point detector 320 and transmit the compensated information about the start point of the first communication signal to the switching signal generator 330. In this case, the switching signal generator 330 may generate the TDD switching signal based on the information about the start point of the first communication signal in which the time delay value is compensated.

According to an embodiment, the time delay value used in the switching signal compensator 350 may be stored in the memory 340 as a preset value.

According to another embodiment, the time delay value used in the switching signal compensator 350 may be a value obtained by measuring a delay value generated in the repeater 400.

The receiver error detector 360 may detect whether or not an error has occurred in reception of the first communication signal of the receiver 310.

According to an embodiment, the receiver error detector 360 may determine that an error has occurred when the first communication signal at the receiver 310 is not received within a certain period of time.

According to another embodiment, the receiver error detector 360 may determine that an error has occurred when the information about the start point of the first communication signal is not obtained from the first communication signal by the frame start point detector 320.

The receiver error detector 360 may transmit information about the occurrence of an error to the switching signal generator 330. In this case, the switching signal generator 330 may maintain the existing TDD switching signal without generating a new TDD switching signal. According to an embodiment, the existing TDD switching signal may be stored in the memory 340.

Figure 4:
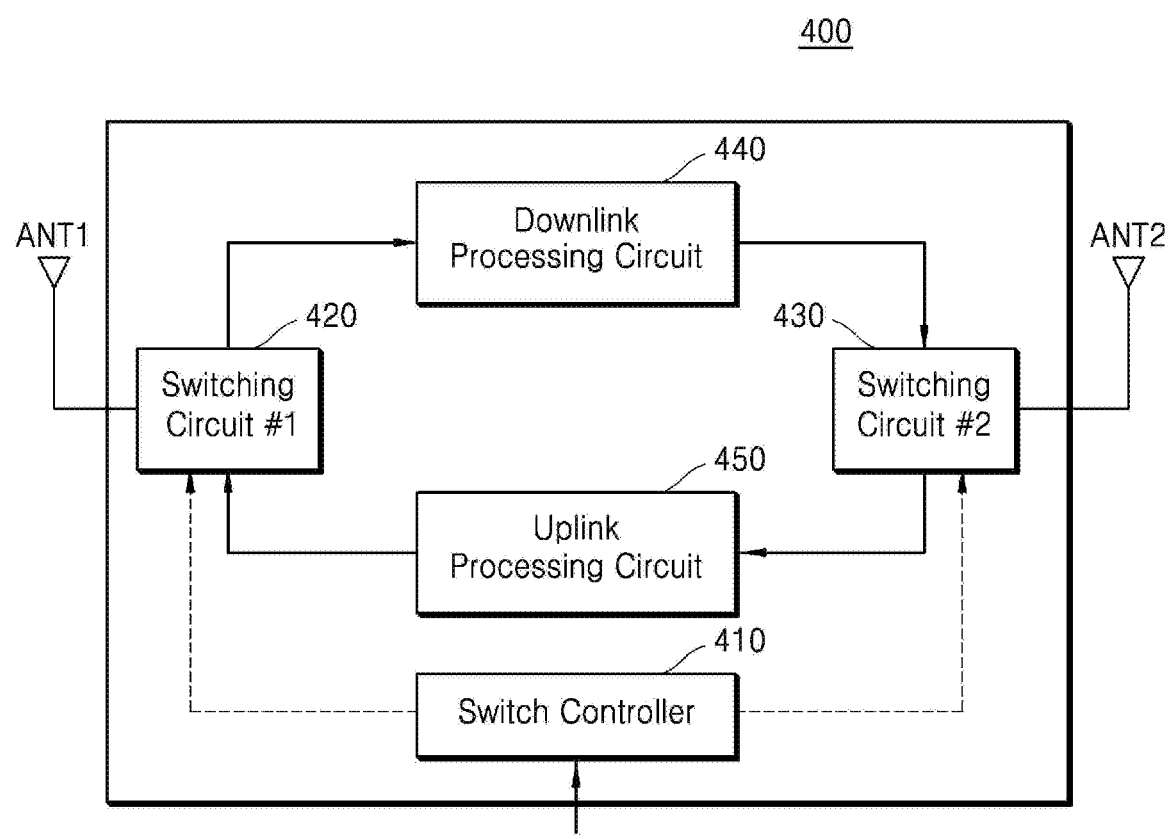
FIG. 4 is a block diagram according to an embodiment of a repeater shown in FIG. 1.
Figure 5:
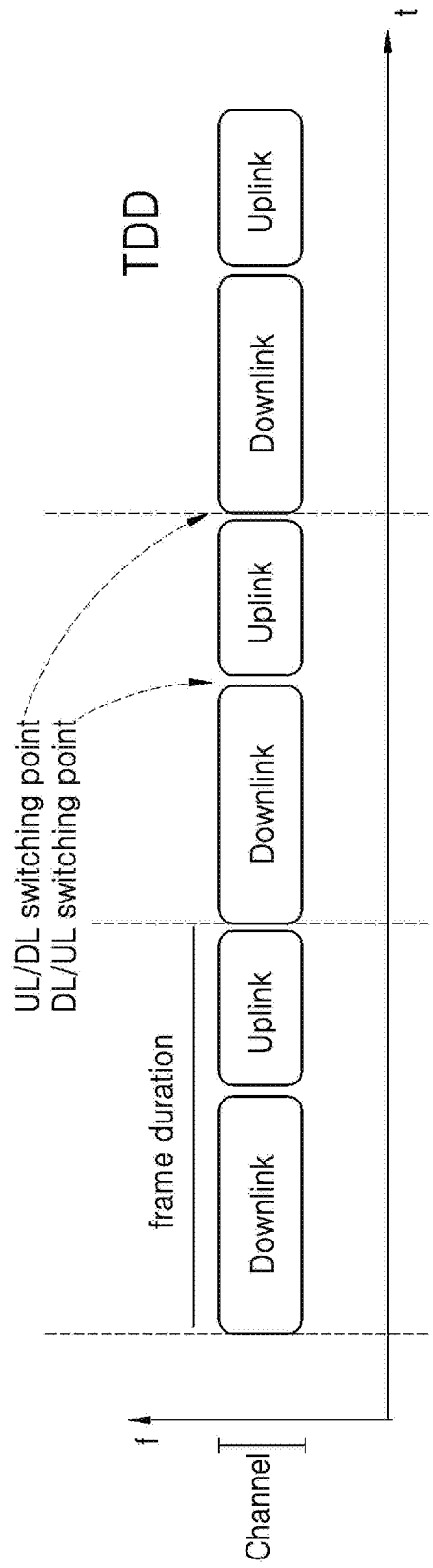
FIG. 5 is a conceptual diagram of TDD switching according to a mobile communication standard according to an embodiment.

FIG. 4 is a block diagram according to an embodiment of the repeater shown in FIG. 1. FIG. 5 is a conceptual diagram of TDD switching according to a mobile communication standard according to an embodiment.

Referring to FIGS. 1 and 4, the repeater 400 may include a switch controller 410, a first switching circuit 420, a second switching circuit 430, a downlink processing circuit 440, and an uplink processing circuit 450.

The switch controller 410 may receive the TDD switching signal generated by the uplink-downlink switching signal generator 300 and may generate the first switching circuit 420 and the second switching circuit 430 based on the received TDD switching signal.

According to an embodiment, when the TDD switching signal is a signal for switching from an uplink to a downlink, the switch controller 410 may connect the first switching circuit 420 and the second switching circuit 430 to the uplink processing circuit 450.

According to another embodiment, when the TDD switching signal is a signal for switching from the downlink to the uplink, the switch controller 410 may connect the first switching circuit 420 and the second switching circuit 430 to the downlink processing circuit 440.

The first switching circuit 420 may selectively connect the first antenna ANT1 to the downlink processing circuit 440 or the first antenna ANT1 to the uplink processing circuit 450 according to the TDD switching.

The second switching circuit 430 may selectively connect the second antenna ANT2 to the downlink processing circuit 440 or the second antenna ANT2 to the uplink processing circuit 450 according to the TDD switching operation.

The downlink processing circuit 440 may process the first communication signal received through the first antenna ANT1 in downlink communication and transmit the processed first communication signal to the second antenna ANT2.

According to an embodiment, the downlink processing circuit 440 may include at least one of a low noise amplifier, an attenuator, a filter, and a high power amplifier.

The uplink processing circuit 450 may process the first communication signal received through the second antenna ANT2 in uplink communication and transmit the processed first communication signal to the first antenna ANT1.

According to an embodiment, the uplink processing circuit 450 may include at least one of a low noise amplifier, an attenuator, a filter, and a high power amplifier.

Referring to FIG. 5, the repeater 400 may relay the second communication signal transmitted according to the second mobile communication standard and may repeatedly switch a downlink and an uplink within frame duration of the second communication signal.

According to an embodiment, a downlink-uplink (DL/UL) switching point that is switched from a downlink to an uplink and an uplink-downlink (UL/DL) switching point that is switched from an uplink to a downlink may be determined by the TDD switching signal transmitted from the uplink-downlink switching signal generator 300.

Figure 6:
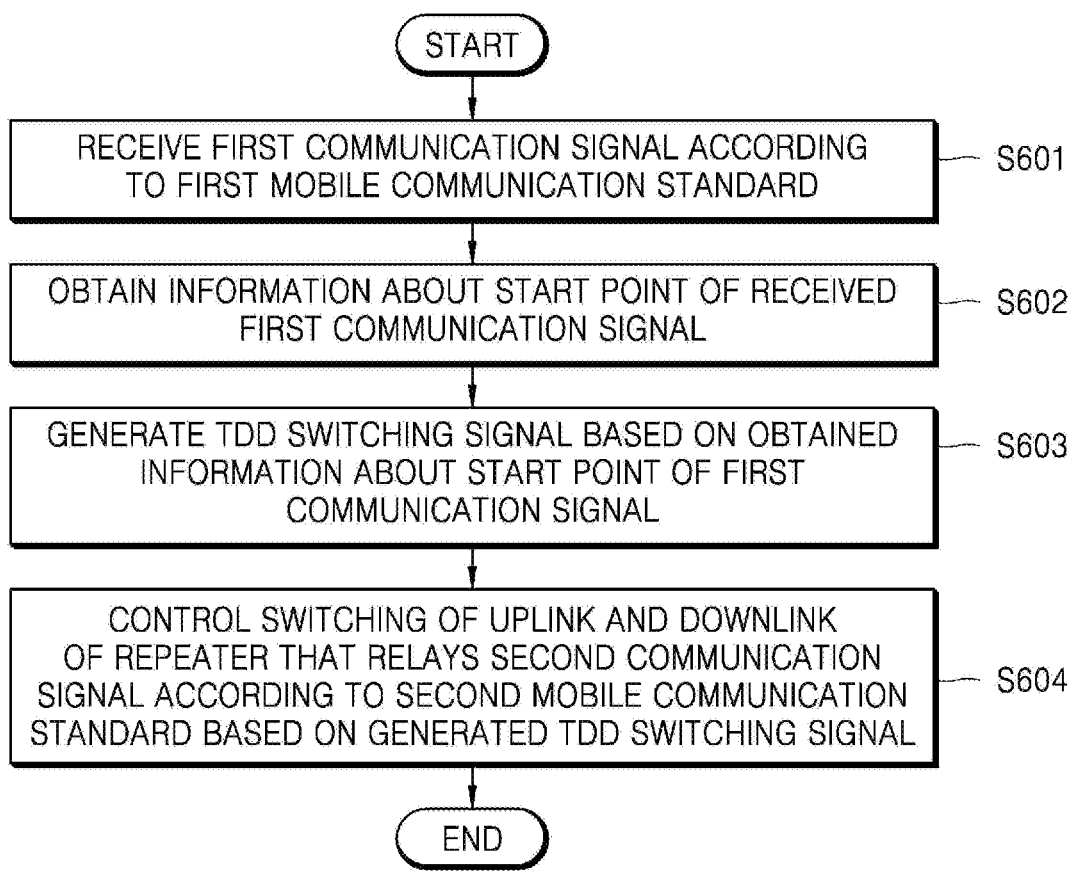
FIG. 6 is a flowchart of an operating method of a repeater according to an embodiment.

FIG. 6 is a flowchart of an operating method of a repeater according to an embodiment.

Referring to FIGS. 1 to 6, in operation S601, the uplink-downlink switching signal generator 300 may receive the first communication signal according to the first mobile communication standard.

In operation S602, the uplink-downlink switching signal generator 300 may obtain information about the start point of the received first communication signal.

In operation S603, the uplink-downlink switching signal generator 300 may generate a TDD switching signal based on the obtained information about the start point of the first communication signal.

According to an embodiment, the uplink-downlink switching signal generator 300 may generate the TDD switching signal based on the obtained information about the start point of the first communication signal and the TDD switching pattern information of the second communication signal according to the second mobile communication standard.

Referring to FIG. 3, the TDD switching pattern information may be determined based on at least one of one period of the downlink-uplink pattern PRD, the number of consecutive downlink slots N-SLTDL, the number of consecutive downlink symbols from the last downlink slot N-SYMDL, the number of consecutive uplink slots from the end of the downlink-uplink pattern N-SLTUL, and the number of consecutive uplink symbols from the first uplink slot N-SYMUL.

In operation S604, the repeater 400 may control switching of an uplink and a downlink of the repeater that relays the second communication signal according to the second mobile communication standard based on the generated TDD switching signal.

According to an embodiment, the first base station 100-1 may provide a communication service according to a previous communication standard (e.g., the LTE standard or the LTE-A standard) and the second base station 100-2 may provide a communication service according to the latest communication standard (E.g., the 5G standard).

While the disclosure has been particularly shown and described with reference to embodiments thereof, it will be understood that various changes in form and details may be made therein without departing from the spirit and scope of the following claims.

What is claimed is:

1. An operating method of a repeater, the operating method comprising:
 receiving a first communication signal according to a first mobile communication standard;
 generating a time division duplex (TDD) switching signal based on information about a frame start point of the received first communication signal; and
 controlling switching of an uplink and a downlink of the repeater that relays a second communication signal according to a second mobile communication standard based on the generated TDD switching signal,
 wherein the first mobile communication standard is a Long Term Evolution (LTE) standard or an LTE-A standard, and the second mobile communication standard is a 5G standard.

2. The operating method of claim 1, further comprising:
 obtaining information about the frame start point of the first communication signal from the received first communication signal.

3. The operating method of claim 2, wherein the obtaining of the information about the frame start point of the first communication signal comprises:
 obtaining the information about the frame start point by using a preamble of the first communication signal or extracting a synchronization signal included in the first communication signal to obtain the information about the frame start point.

4. The operating method of claim 1, wherein the generating of the TDD switching signal comprises:
 generating the TDD switching signal based on the information about the frame start point of the received first communication signal and TDD switching pattern information of the second communication signal.

5. The operating method of claim 4, wherein, the TDD switching pattern information is determined based on a period of a downlink-uplink pattern, a number of consecutive downlink slots, a number of consecutive downlink symbols from a last downlink slot, a number of consecutive uplink slots from the end of the downlink-uplink pattern, and a number of consecutive uplink symbols from a first uplink slot.

6. The operating method of claim 1, wherein, the generating of the TDD switching signal comprises:
 generating the TDD switching signal by compensating a preset time delay value for the information about the frame start point of the received first communication signal.

7. The operating method of claim 1, further comprising determining whether or not an error has occurred in the reception of the first communication signal.

8. The operating method of claim 7, wherein the generating of the TDD switching signal comprises:
 generating the TDD switching signal based on a previously-used TDD switching signal, when an error has occurred in the reception of the first communication signal.

9. A repeater comprising:
 a processor configured to receive a first communication signal according to a first mobile communication standard and generate a TDD switching signal based on information about a frame start point of the received first communication signal; and
 a switching circuit configured to control uplink and downlink switching of the repeater that relays a second communication signal according to a second mobile communication standard based on the generated TDD switching signal,
 wherein the first mobile communication standard is a Long Term Evolution (LTE) standard or an LTE-A standard, and the second mobile communication standard is a 5G standard.

* * * * *